Patented Apr. 25, 1950

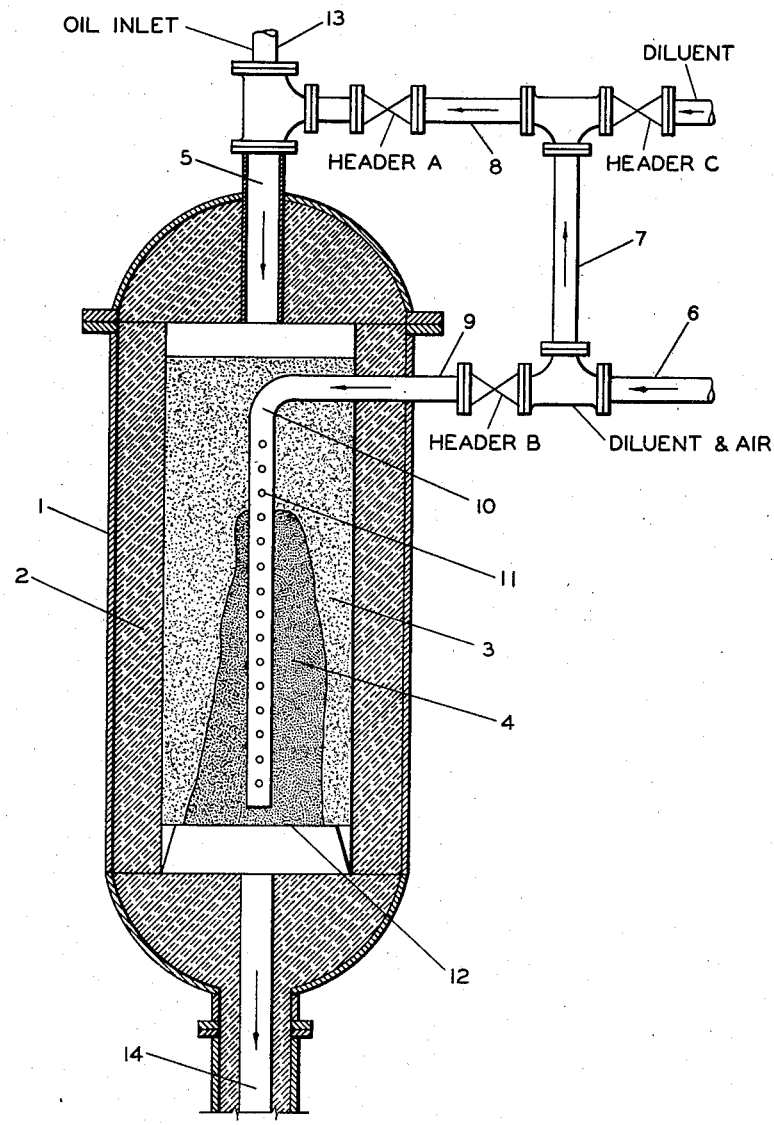

2,505,263

UNITED STATES PATENT OFFICE 2,505,263

METHOD OF REGENERATING A FIXED BED CATALYST

Harry Darby Trotter, Kansas City, Kans., assignor to Phillips Petroleum Company, a corporation of Delaware Application March 26, 1946, Serial No. 657,218

3 Claims. (Cl. 252—416)

The present invention relates to the reactivation of solid granular catalysts which have been deactivated by the deposition of carbonaceous material thereon and more particularly to the reactivation of spent catalytic material contained in fixed beds of granular catalysts.

In a preferred aspect the present invention relates to the reactivation of solid granular catalysts arranged in fixed beds which have become deactivated by contact at conversion temperatures with hydrocarbons. The conversion referred to may be any reaction which will result in the deposition of carbonaceous material on the contact material or catalyst and in which said contact material or catalyst may be revivified or renewed in activity by combustion of said deposits utilizing oxygen-containing reactivation gases. Such reactions may include cracking, dehydrogenation, polymerization, reforming, cyclyzation, or in general reactions for decomposition, conversion or synthesis of organic materials particularly as applied to the treatment of hydrocarbons. It may also be applied to conversions wherein the reaction is essentially thermal, which are conducted in the presence of solid contact material but in which deposits of the carbon on the solid contact material makes periodic reactivation desirable.

In conventional processes for the conversion of hydrocarbons by contact with catalyst beds at elevated temperature as in catalytic cracking using fixed catalyst beds a plurality of catalyst chambers is provided so that while one or more are on the process portion of a cycle one or more will also be simultaneously on the reactivation portion of the cycle during which carbonaceous material is removed by combustion with an oxygen-containing regeneration gas. In this type of catalyst reactivation it has been found that once combustion is initiated in the bed it proceeds through the bed in the form of a relatively narrow combustion zone which moves progressively through the bed in the direction of flow of the reactivation gas. When this combustion zone has moved through the bed, surface carbon has been removed and reactivation is substantially complete except for a minor proportion of residual carbon which is within the pores of the catalyst and which requires continued treatment under combustion conditions for complete removal. It is ordinarily not necessary to remove this residual carbon since the combustion of the surface carbon appears to substantially return the catalyst to its original activity.

In actual practice, however, it has been found that in an elongated bed, combustion proceeds in such a manner that after the combustion zone has progressed through the bed and free oxygen appears in the reactivation gas effluent, there remains in the bed a residual substantially uncombusted region or zone of catalyst material which is roughly of a conical shape and is centrally positioned in the lower portion of the bed along the axis thereof with its base adjacent the bottom or outlet portion of the bed. The dimensions of this conical region will depend on a number of factors and will vary particularly with diameter and length of the bed and rate of flow and composition of reactivating gas. In general, this conical region occupies less than fifty percent of the total volume of the bed and has a height of less than half of the total height of the bed and at its widest portion is somewhat less than half the diameter of the bed.

This residual carbonaceous zone if not removed will obviously detract from the total amount of reactivated catalyst available for the succeeding reaction. It has also been found that in order to effect complete removal of the carbon in this zone by conventional methods, a substantial additional period of time is required during which period in addition substantial amounts of oxygen continue to be removed in the effluent. Thus, removal by conventional methods would entail substantial loss of time and waste of reactivating gas. The presence of this zone is apparently due to channeling of flow of reactivating gas to the outer edge of the catalyst bed, particularly in the latter portions thereof.

It is, therefore, an object of the present invention to provide a method and apparatus for catalyst reactivation in which substantially complete and uniform removal of carbon throughout the catalyst bed is effected with high oxygen efficiency and in a shortened period of time. It is a further object of the present invention to provide a method and apparatus which will permit removal of carbon from the unreactivated portion of the bed which would otherwise remain at the time of oxygen break-through.

In accordance with the present invention it has been found that by introducing reactivating gas directly into the carbonized zone of substantially conical form, at one or more points along the axis of said zone, after the initial period of reactivation has been carried out, substantially uniform removal of carbon throughout the bed will result. Preferably, this supplemental reactivating gas is introduced while continuing the main flow of gas at the inlet. In general, the reactivation may be carried out at this point by splitting the total flow of reactivating gas into two streams, usually with the major portion continuing through the entrance to the bed, the minor portion being introduced into the uncombusted conical region. It has further been found that by incorporating in the reactivation chamber an additional header which is perforated and which extends axially through the bed and through the axis of the region within which the unreactivated cone tends to form, and by introducing reactivating gas through this header as well as through the inlet to the chamber after oxygen begins to appear in the effluent, the carbon within the conical area is readily removed. Preferably the header is perforated at a plurality of points so that reactivating gas may be introduced at a number of points internally of the cone along its longitudinal axis.

The process and apparatus described herein will achieve the following results, (a) increased air efficiency, or in other words, reduction in cubic feet of air required per pound of carbon removed, (b) reactivation cycles will require a shorter time, (c) reactivation flow rates can be increased as pressure drop is relieved due to removal of the carbonized cone; hence more thorough clean-up carbon will be achieved.

The present invention may be further described with reference to the drawing which shows in cross section a catalyst chamber containing a partially reactivated catalyst bed and showing the conical region of unreactivated catalyst. The figure 1 is a catalyst chamber having a steel shell which is lined with refractory insulating material 2, and which contains positioned therein granular catalyst material 3. The cone of unreactivated catalyst is shown at 4. During the conversion portion of the cycle oil or other material to be converted is introduced through inlet 13 and removed through outlet 14. The catalyst is supported on a grid which is shown in side elevation at 12. During the reactivation period reactivating gas, comprising for example, air and a diluent such as steam, is introduced via line 6 through line 7 and header 8 into inlet pipe 5. This gas being at a temperature high enough to initiate combustion will remove carbon during the reactivation by oxidation, and the combustion zone will move progressively through the bed. At the time that oxygen break-through appears in the effluent the partially reactivated catalyst will have approximately the cross-sectional form shown in the drawing with the unreactivated portion shown as at 4. In order to eliminate this region and permit reactivation to be uniform a perforated pipe 10 is positioned through the bed, and after or before oxygen break-through appears in the effluent at least a portion of the reactivating gas mixture is simultaneously introduced from line 6 through line 9 and through the perforations 11, in pipe 10. In order to permit the bulk of the regeneration to be carried out in a normal manner with a combustion zone moving progressively from inlet to outlet, it is desirable to begin introducing air into the conical zone after oxygen break-through has been observed in the effluent. Additional diluent for control of temperature, etc. may be introduced as desired through header C.

The process will now be described with reference to a typical operation charging a petroleum oil for catalytic cracking. The bed in the catalyst chamber has a diameter of 12½ feet and a height of 13 feet. The bed contains 60,000 pounds of 4–8 mesh catalyst. 250 barrels per hour of 36° A. P. I. virgin gas oil obtained from West Texas crude is charged. The inlet temperature to the bed is 1020° F. at a pressure of 85 pounds per square inch gauge, the outlet temperature is 950° F. at a gauge pressure of 80 pounds. Steam is admixed with the feed in the proportion of 9600 pounds per hour at a temperature of 375° F. and pressure of 190 pounds per square inch absolute. The products are recovered and fractionated to separate gasoline in the usual manner. After a process period of 6 hours flow of feed is switched to a duplicate chamber containing fresh catalyst. The spent catalyst contains a total of 6000 pounds of carbon deposited thereon.

The reactivation is carried out by introducing a reactivating gas comprising air and steam at the rate of 215,000 cubic feet per hour of air and 60,000 pounds per hour of steam. This mixture enters the main inlet to the chamber at 700° F. and the spent reactivating gas leaves the chamber at a temperature of 1350° F. After a period of three hours the partially regenerated bed contains an unreactivated region having the rough configuration of a truncated cone positioned with its base at the bottom of the bed, said base having a diameter of about 5 feet, the conical region being 6 feet in height and approximately 1½ feet in diameter at the apex. At the end of the three hour period oxygen break-through has been noted at the effluent and at this point the auxiliary header B is cut in and the feed of reactivating gas distributed as follows:

To the top of the bed air 165,000 cubic feet per hour, steam 47,500 lbs./hr.

To header B, air 50,000 cubic feet per hour, steam 25,000 lbs./hr.

After an additional two hours 45 minutes of flow of reactivating gas in this manner reactivation of the catalyst bed is complete.

At the conclusion of the regenerating period the catalyst is found to be uniformly and substantially completely reactivated. When operating in the usual manner with introduction of reactivating gas only at the top it required at least 20 per cent more air and steam to effect substantially complete reactivation in the same period of time. Furthermore, in normal operation in the usual manner without the auxiliary header it was found that the outlet temperature on the catalyst chamber dropped substantially due to the fact that a relatively large volume of reactivating gas and diluent in proportion to the carbon present was required to effect complete reactivation. In the present method the outlet temperature will not drop substantially due to the increased oxygen efficiency of the process.

Where temperatures tend to rise due to variation in carbon content or other factors affecting heat exchange, the desired temperature may be maintained by introducing additional diluent through header C, or by adjusting the feed rate of oxygen-containing gas, or by other suitable methods. In general, oxygen break-through will occur approximately midway during the calculated time required to burn the deposited carbon and it is at this point that the flow of auxiliary reactivation gas is preferably initiated.

I claim:

1. In the removal of carbonaceous deposits from solid contact material disposed in a fixed bed, by combustion with an oxygen-containing gas, wherein said gas is introduced at one end of the bed at a temperature sufficient to at least initiate combustion and is removed in a spent condition from the other end of the bed, and wherein a zone containing residual uncombusted carbonaceous deposit remains in said bed near said other end at the time when oxygen appears in the effluent, the method of effecting substantially uniform removal of carbon throughout the bed of contact material which comprises introducing a stream of oxygen-containing gas into one end of the bed and passing said gas longitudinally therethrough under combustion conditions until free oxygen begins to appear in the effluent, and thereafter introducing an additional stream of oxygen-containing gas under combustion conditions directly into said zone of uncombusted carbon, and continuing the flow of both streams until uniform reactivation is substantially complete.

2. A method for reactivating a bed of granular catalytic material deactivated by deposition of carbon thereon, which comprises flowing a stream of oxygen-containing gas into one end of bed and passing said gas longitudinally thereof under combustion conditions and permitting a combustion zone to migrate through said bed in the direction of flow of said stream, continuing flow of said gas until free oxygen begins to appear in the effluent from said bed, and then thereafter introducing additional oxygen-containing reactivating gas into said bed at an intermediate point thereof and passing said additional gas laterally into the latter portion of said bed from a plurality of points between said intermediate point and the end of said bed while continuing flow of at least a portion of said gas into said bed inlet, and continuing flow of reactivating gas into said inlet and said intermediate point until said deposited carbon is removed substantially uniformly throughout the bed.

3. A method of reactivating a fixed bed of granular catalytic material which has been deactivated by deposition of carbon thereon which comprises flowing oxygen-containing reactivation gas longitudinally through said bed from one end to the other under combustion conditions until free oxygen appears in the effluent, then introducing oxygen-containing gas laterally at a plurality of points distributed internally and centrally along the axis of the bed extending from an intermediate point to the outlet thereof under combustion conditions to effect further removal of carbon and continuing the flow of both streams of reactivation gas until said combustion is substantially complete.

HARRY DARBY TROTTER.

REFERENCES CITED

The following references are of record in the file of this patent:

UNITED STATES PATENTS

| Number | Name | Date |
| --- | --- | --- |
| 1,828,146 | Joseph | Oct. 20, 1931 |
| 2,073,638 | Houdry | Mar. 16, 1937 |
| 2,330,710 | Hemminger | Sept. 28, 1943 |
| 2,349,045 | Layng et al. | May 16, 1944 |
| 2,362,621 | Fahnestock | Nov. 14, 1944 |
| 2,394,710 | McAfee | Feb. 12, 1946 |
| 2,395,106 | Day et al. | Feb. 19, 1946 |
| 2,398,186 | Loy | Apr. 9, 1946 |